C. F. HAMILTON.
TAIL, NUMBER, AND SAFETY SIGNAL FOR VEHICLES.
APPLICATION FILED FEB. 15, 1911.
1,066,900.    Patented July 8, 1913.
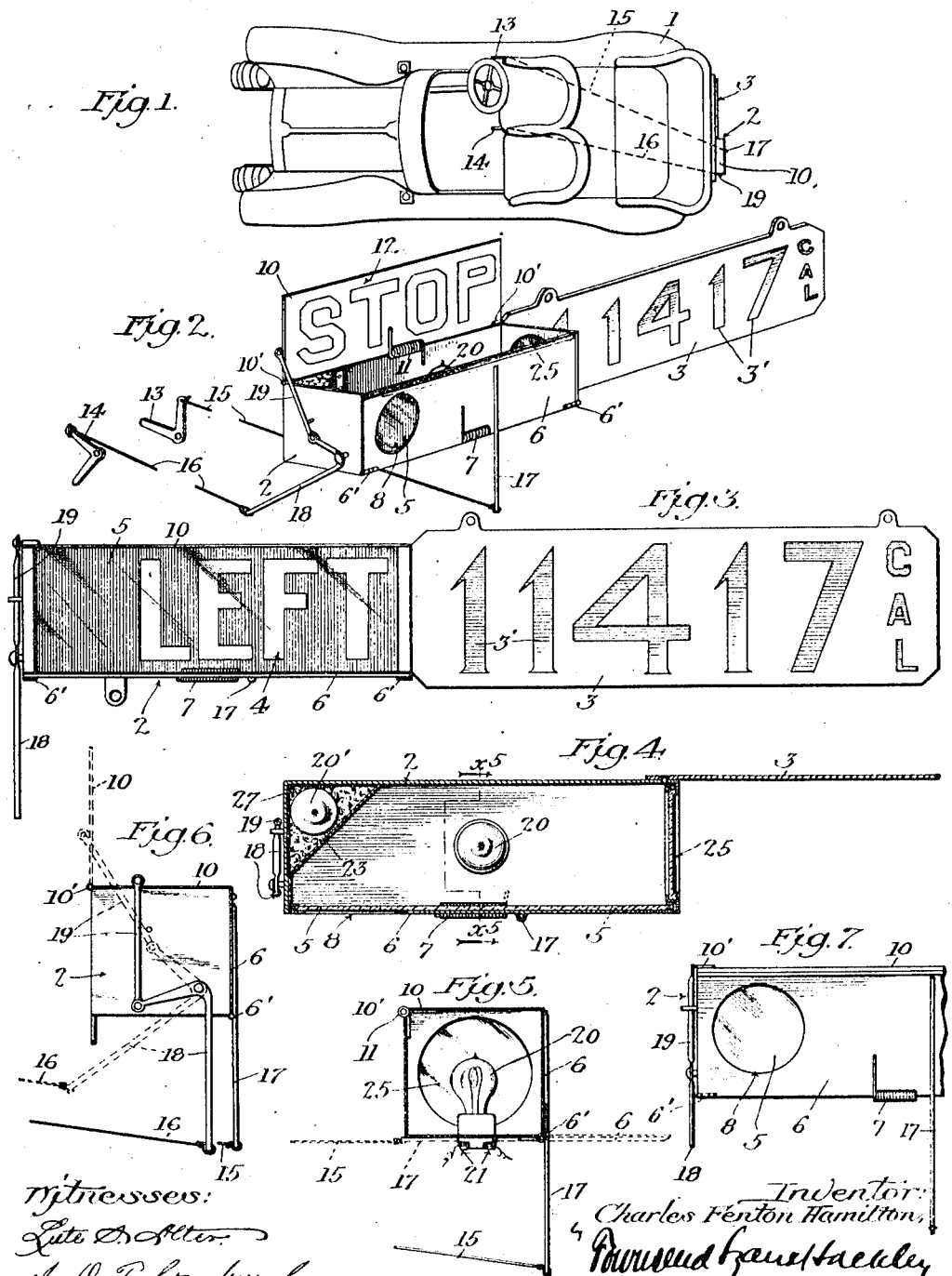

UNITED STATES PATENT OFFICE.

CHARLES FENTON HAMILTON, OF LOS ANGELES, CALIFORNIA.

TAIL, NUMBER, AND SAFETY SIGNAL FOR VEHICLES.

1,066,900.

Specification of Letters Patent.

Patented July 8, 1913.

Application filed February 15, 1911. Serial No. 608,823.

*To all whom it may concern:*

Be it known that I, CHARLES FENTON HAMILTON, a citizen of the United States, residing at Los Angeles, in the county of Los Angeles and State of California, have invented a new and useful Tail, Number, and Safety Signal for Vehicles, of which the following is a specification.

This invention relates to signal devices for automobiles and other vehicles and one object of the invention is to provide means whereby the same illuminating means can be used for a tail lamp, for illuminating the number of the automobile and for illuminating signals, such as direction signals.

Another object of the invention is to provide direction signal means for vehicles which is of simple construction and effective in operation.
Other objects of the invention will appear hereinafter.

The accompanying drawings illustrate the invention, and referring thereto:

Figure 1 is a plan of the vehicle showing the manner in which the signal means is applied and operated. Fig. 2 is a perspective of the signal means. Fig. 3 is a rear elevation of the signal means with one of the direction signals exposed. Fig. 4 is a horizontal section of the signal means. Fig. 5 is a vertical section on line $x^5$—$x^5$ in Fig. 4. Fig. 6 is an end elevation of the signal means. Fig. 7 is a front elevation of a portion of the signal means showing the shutter thereof in closed position.

1 designates the body of an automobile, on the rear end of which is provided a signal box 2 and a number plate 3, said number plate being preferably attached to the signal box, as shown in Fig. 4, and being provided with means for attaching the numbers 3' thereto in the usual manner. The signal box 2 is open at the top and is provided at its front side with a transparent or translucent plate 5 which may be colored or coated with a red translucent layer, except for a portion thereof left clear to form a signal symbol 4, said portion, for example, forming the signal word "Left", indicating that the vehicle is to turn to the left. A front shutter 6 is hinged to the box 2 at 6' and is provided with a spring 7 tending to close said shutter, so as to hide the plate 5, said shutter being provided however with an opening or aperture 8 through which a portion of said transparent plate 5 is exposed so as to exhibit a rear signal through said aperture. A top shutter 10 is hinged at 10' to the upper rear edge of the box 2 and is provided with a spring 11 tending to hold the same closed and on its underface, which is the face exposed when the said top shutter is raised, there is provided or formed a signal mark or symbol, such as the word "Stop", indicated at 12. The said shutters 6 and 10 are operated by any suitable means, for example, by levers 13 and 14 located adjacent to the driver's seat of the vehicle and connected by rods 15 and 16, respectively, with an arm 17 attached to shutter 6 and with the bell crank 18 pivoted on the box 2 and connected by link 19 with the shutter 10. Illuminating means, such as an electric lamp, indicated at 20, provided with connection means 21 for an electric supply circuit, is provided within the box 2 and the interior of said box is painted white or otherwise provided with reflecting surfaces adapted to reflect the light from said lamp against the rear side and top of the box. The said box is also provided with a corner reflector 23 extending opposite the aperture 8, so as to reflect an additional quantity of light through said aperture. The end of the box which is toward the number plate 3 is provided with an aperture 25 through which light may shine from the lamp 20 and from the reflecting surfaces on the interior of the box, so as to illuminate the number plate.

The operation is as follows: Assuming that the lamp 20 is in operation, the signal number 3' is constantly illuminated and the colored transparent plate 5 is also illuminated, so that the portion thereof which is exposed through the aperture 8 appears as a tail light, it being understood that under normal conditions, both the rear and top shutters 6 and 10 are closed, so that neither of the signal marks or symbols 4 or 12 is exposed. If the driver intends to turn to the left, he will operate lever 13 to cause the rear shutter 6 to be lowered, thereby exposing the signal symbol "Left" on the transparent plate 5, this signal being illuminated, as stated, by the lamp 20. If he intends to stop, he will operate the lever 14 to raise the top shutter 10 which is at this time illuminated by light from the lamp 20 and from the reflecting surfaces on the inside of the box.

The pocket or space 27 between the corner reflector 23 and the walls of the box serves as a convenient receptacle for a reserve signal lamp, indicated at 20'.

What I claim is:

A signal for vehicles comprising a box, a cover with its back edge hinged to the top back edge of the box to swing upwardly, the front wall of the box comprising an outer plate hinged at its lower edge to the lower front corner of the box, said plate having an aperture near one end thereof, a transparent panel fixed in the box back of said plate and extending across the aperture in the said hinged plate, the portion of said panel extending across said aperture being plain and the portion of said transparent panel back of the imperforate portion of the plate having a sign, said cover having a sign on its under face, the end of said box having an aperture, lighting means within said box visible through the aperture in the end and in the front plate, means for operating said cover and means for operating said front plate independently of the cover.

In testimony whereof, I have hereunto set my hand at Los Angeles, California, this 9th day of February, 1911.

CHARLES FENTON HAMILTON.

In presence of—
ARTHUR P. KNIGHT,
FRANK L. A. GRAHAM.